Patented Dec. 21, 1943

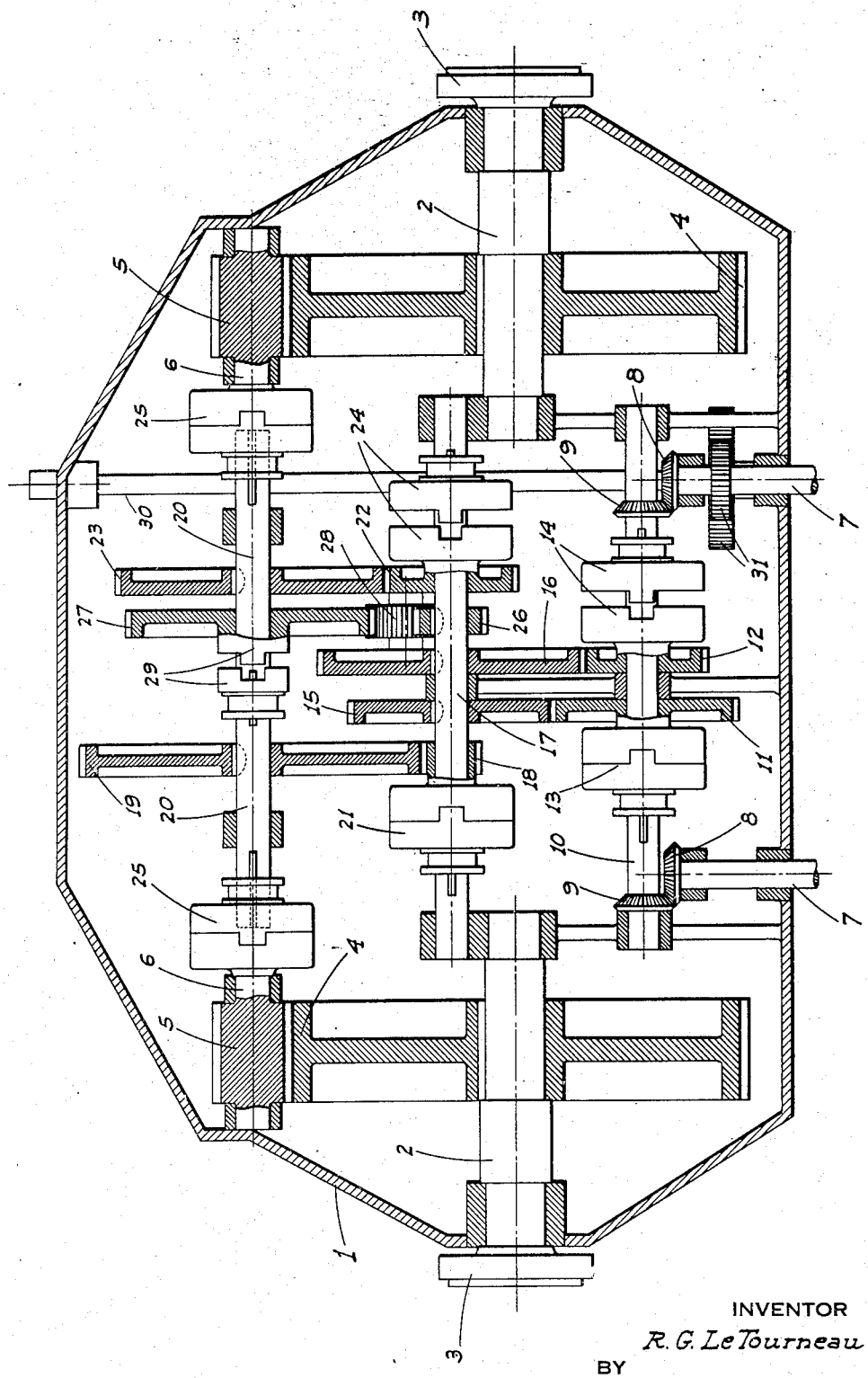

2,337,255

UNITED STATES PATENT OFFICE 2,337,255

TRANSMISSION

Robert G. Le Tourneau, Peoria, Ill., assignor to R. G. Le Tourneau, Inc., Stockton, Calif., a corporation of California Application July 11, 1942, Serial No. 450,559

3 Claims. (Cl. 74—360)

This invention relates to transmission mechanisms for vehicles driven by internal combustion engines, and particularly tractors.

The principal object is to provide a transmission for the purpose so constructed that speed changes are effected without the movement of any gears into or out of mesh with each other, so that no gear clash or tooth stripping is possible.

A further object is to provide a transmission of this character so constructed that it is impossible to lose control, as sometimes occurs under certain operating conditions, with conventional transmissions when attempting to shift from one gear to another.

Another object is to arrange the transmission so that it may be readily connected to twin drive shafts, as when twin engines are used on the tractor, while at the same time the transmission is also adapted, without material change, for use with a single drive shaft and engine.

These objects I accomplish by means of such structure and relative arrangement of parts as will fully appear by a perusal of the following specification and claims.

The figure on the drawing is a sectional plan of my improved transmission, showing a set of intermediate speed gears as functioning.

Referring now more particularly to the characters of reference on the drawing, the structure comprises an enclosed housing 1 in which is journaled a pair of transverse and alined but spaced stub axles 2, on the outer end of which flanges 3 are mounted for attachment to suitable drive wheels. Each axle within the housing carries a bull gear 4 meshing with pinions 5 secured on separate stub spindles 6 journaled in the housing in alinement with each other and adjacent the rear end of said housing.

Transversely spaced parallel drive shafts 7, from separate twin engines, project into the housing from its front and at right angles to the axle 2. Within the housing these shafts carry bevel gears 8 meshing with bevel gears 9 fixed on a transverse countershaft 10 journaled in the housing adjacent its forward end.

Separately turnable on the shaft 10 intermediate its ends are spur gears 11 and 12 disposed somewhat close to each other. These gears are rigid with one member of clutches 13 and 14 respectively, disposed laterally out from the gears; the cooperating members of which clutches are splined on the shaft 10. It will here be noted that while these and other clutches are here shown conventionally, in practice they are preferably of a special type, such as shown in the copending application of O. R. Peterson, et al., Serial No. 448,082, filed June 23, 1942.

The gears 11 and 12 mesh with other gears 15 and 16 respectively, keyed on a second countershaft 17 parallel to the shaft 10 and journaled in the housing rearwardly thereof; the pairs of gears being of different sizes to give different speed ratios.

Turnable on the shaft 17 is a pinion 18 meshing with a gear 19 keyed on a third countershaft 20 journaled in the housing between and in line with the spindles 6. The pinion 18 is rigid with one member of a clutch 21 disposed laterally out from said pinion, the other member of the clutch being splined on the shaft 17. Another pinion 22, larger than the pinion 18, is also turnable on the shaft 17 and meshes with a gear 23 smaller than the gear 19 and keyed on shaft 20. The pinion 22 is fixed with one member of a clutch 24 disposed laterally out from said pinion, the cooperating member of the clutch being splined on the shaft 17. The pinions 18 and 22 are disposed on opposite sides of gears 15 and 16.

The spindles 6 are fixed in connection with one member of individual clutches 25, the other members of which are splined on the shaft 20.

Between the gear 16 and the pinion 22, another pinion 26 is keyed on the shaft 17, which is alined with but separated from a gear 27 turnable on the shaft 20. A pinion or gear 28 is disposed between and meshes with the pinion 26 and gear 27 so that the latter turns in the same direction as said pinion. The gear 27 is fixed with one member of a clutch 29 disposed between gears 27 and 19, the other member of this clutch being keyed on the shaft 20. It will thus be seen that a very compact gear and clutch arrangement is provided which occupies a minimum of space laterally. Also, since the axles are disposed in a plane intermediate the front and rear shafts 10 and 20, the transmission as a whole is not excessively long. All the clutches are individually controlled, the clutches 25 being for the purpose of enabling one pinion 5 and its axle, or both, to be driven as may be desired, and provides an arrangement in this respect such as is commonly used for steering tractors of a certain type.

With the arrangement of parts and relative proportion of the gears as shown and above described, when it is desired to operate at the lowest or first speed, the clutches 14 and 21 only are engaged, as well of course as either or both clutches 25.

The drive from the engine 7, which is constantly imparted to the shaft 10, is then transmitted through gears 12 and 16, shaft 17, pinion 18 and gear 19, to the shaft 20 and then to the axle gears.

When the second speed operation is desired, the clutch 13, instead of the clutch 14, is engaged—clutch 21 remaining engaged also. The drive is then transmitted to gears 11 and 15, pinion 18 and gear 19, and then to the axle gears, as before. This is the drive illustrated in the drawing. When third speed operation is desired the clutches 14 and 24 are engaged, the clutches 13 and 21 being then disengaged. The drive is then transmitted through the gears 12 and 16 to the shaft 17, and through pinion 22 and 23 to shaft 20.

For the fourth or high-speed drive the clutch 13, instead of the clutch 14, is engaged, bringing the high speed ratio of gears 11 and 15 into play.

For a reverse drive the clutch 29 is engaged and either clutch 13 or 14 as well, the clutches 21 and 24 being of course disengaged. This gives an optional two-speed reverse drive, either through gears 12 and 15 to the pinion 26, or through gears 11 and 15 to said pinion and thence to the gear 27 and shaft 20.

A power take-off shaft 30 is journaled in the housing and projects through the rear end of the same. This shaft is disposed below the countershafts and one of the engine shaft 7, being parallel to the latter. This take-off shaft is driven from said one shaft 7 by means of meshing gears 31 disposed between shaft 10 and the front end of the housing.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as set forth herein.

Having thus described my invention what I claim as new and useful and desire to secure by Letters Patent is:

1. A transmission mechanism comprising an engine driven shaft, a final drive countershaft parallel to the first named shaft, another countershaft between and parallel to the other shafts, separate pairs of constantly meshing gears of different speed ratios on the first and third named shafts disposed in relatively close relation, one gear of each pair being turnable on the engine driven shaft, separately operable clutches connecting said shaft and the turnable gears laterally out from the gears, other pairs of constantly meshing gears of different speed ratios on the final drive shaft and said other countershaft disposed laterally out from but adjacent the first named pairs of gears, one gear of each of said other pairs being turnable on the corresponding shaft, and separately operable clutches connecting said corresponding shaft and the last named turnable gears and disposed laterally out therefrom.

2. A transmission mechanism comprising an engine driven shaft, a final drive countershaft parallel to the first named shaft, another countershaft between and parallel to the other shafts, separate pairs of constantly meshing gears of different speed ratios on the first and third named shafts disposed in relatively close relation, one gear of each pair being turnable on the engine driven shaft, separately operable clutches connecting said engine driven shaft and the turnable gears laterally out from the gears, other pairs of constantly meshing gears of different speed ratios on the final drive shaft and said other countershaft disposed laterally out from but adjacent the first named pairs of gears, one gear of each of said other pairs being turnable on said other countershaft, separately operable clutches connecting said other countershaft and the last named turnable gears and disposed laterally out therefrom, a reverse gear train connecting the final drive shaft and said other countershaft and disposed between the second named pair of gears, said reverse train including a gear turnable on the final drive shaft, and a clutch connecting the final drive shaft and said last named turnable gear.

3. A transmission mechanism comprising a power driven shaft, a final drive countershaft parallel to the first named shaft, another countershaft parallel to and between the other shafts, separate pairs of constantly meshing gears of different speed ratios on the first and third named shafts, one gear of each pair being turnable on the driven shaft, separately operable clutches connecting said driven shaft and the turnable gears, other pairs of constantly meshing gears of different speed ratios on the final drive shaft and said other countershaft, one gear of each of said other pairs being turnable on said other countershaft, separately operable clutches connecting said other countershaft and the last named turnable gears, a reverse gear train connecting the final drive shaft and said other countershaft, said reverse train including a gear turnable on the final drive shaft, and a clutch connecting the final drive shaft and said last named turnable gear.

ROBERT G. LE TOURNEAU.